United States Patent [19]

Otto

[11] Patent Number: 5,313,879
[45] Date of Patent: May 24, 1994

[54] JUICE EXTRACTING MACHINE

[76] Inventor: Walter O. Otto, rua Estilac Leal, 160 a, 174 A, Guarulhos, Sao Paulo, Brazil

[21] Appl. No.: 982,660

[22] Filed: Nov. 27, 1992

[30] Foreign Application Priority Data

Apr. 8, 1992 [BR] Brazil .................... PI 9201383

[51] Int. Cl.$^5$ .............................................. A23N 1/00
[52] U.S. Cl. ........................................ 99/504; 99/507
[58] Field of Search ............... 99/495, 501–504, 99/506–508; 100/98 R, 213

[56] References Cited

U.S. PATENT DOCUMENTS

| | | | |
|---|---|---|---|
| 746,720 | 12/1903 | Lyon | 99/504 |
| 940,628 | 11/1909 | Wiendl | 99/504 |
| 1,386,552 | 8/1921 | Carney | 99/504 |
| 1,888,528 | 11/1932 | Faulds | 99/502 |
| 1,888,529 | 11/1932 | Faulds | 99/502 |
| 2,270,007 | 1/1942 | McKinnis | 99/507 |
| 2,602,479 | 7/1952 | Trainor | 99/504 |
| 2,630,849 | 3/1953 | Williams | 99/504 |
| 2,707,981 | 5/1955 | Trainor | 99/507 |
| 2,753,904 | 7/1956 | Trainor | 99/504 |
| 5,170,699 | 12/1992 | Senalada | 99/507 |

*Primary Examiner*—Timothy F. Simone
*Attorney, Agent, or Firm*—Harrison & Egbert

[57] ABSTRACT

An improved juice extracting machine having an upper structure inside of which is housed a gear box connected to a motor reducer assembly, a feeding cone positioned within a fruit receptacle located over the upper structure, a protector covering a front face of the upper structure and including upper cylindrical and lower prismatic heads of the motor reducer assembly, a worm positioned within the protector, a juice reservoir received under a duct of the protector, and a lower structure attached to the upper structure. The lower structure receives a container therein for receiving solid and liquid residues of the juice extracting process. A collector is positioned adjacent the worm for receiving residues of a screen associated with the protector.

13 Claims, 10 Drawing Sheets

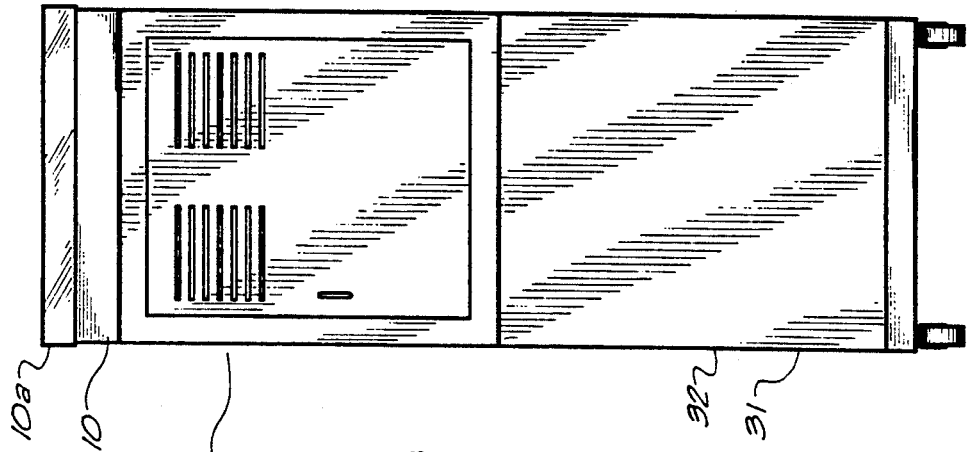
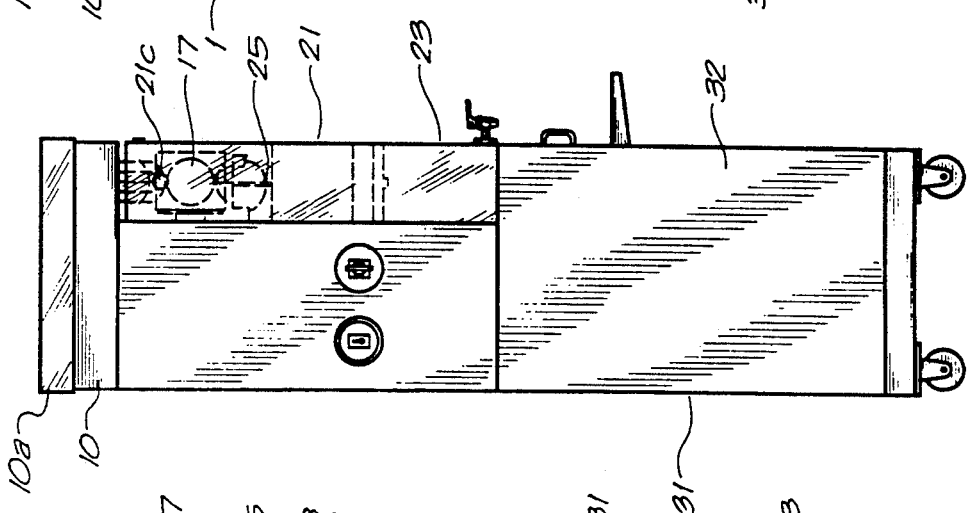
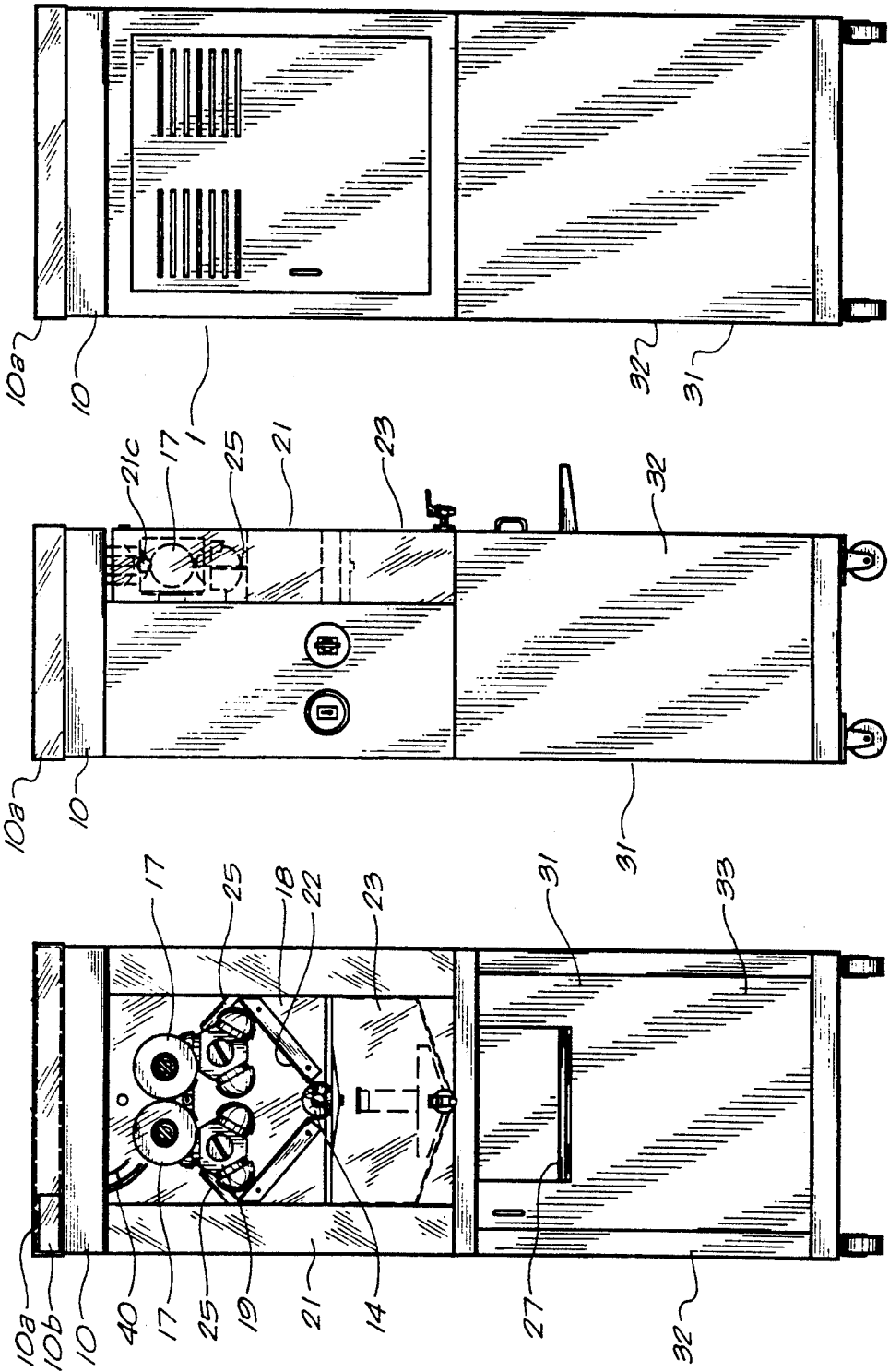

JUICE EXTRACTING MACHINE

TECHNICAL FIELD

The present description refers to a juice extracting machine, and more particularly to a machine for extracting juices from citric fruits, such as oranges, lemons, sweet limes and others.

BACKGROUND ART

As known to all those persons skilled in the art, there is a great variety of juice extracting machines which are largely known and used. Such known machines are used to perform suitable juice extraction of the aforementioned fruits.

Among those known types of juice extracting machines, it should be cited a very conventional one comprising a vertically arranged electrical motor, at the end thereof a conical member is attached and against which half of any citric fruit is manually compressed. Said motor is housed inside a body generally made of plastic or metal whose top portion includes a receptacle for collecting the juice extracted by the conical member.

The above-mentioned kind of extracting machine has dimensions in conformity with specific purposes, such as for domestic use, or for industrial or commercial use. In the case of the first modality of use, it is called a fruit squeezer.

Nevertheless, there are other more sophisticated models intended to process fruit in a mechanical and automatic way, such as disclosed by Patent PI 9005883 for 'JUICE EXTRACTING MACHINE' comprising basically a support structure inside which there is suitably arranged a drive unit engaged with a motor reducer assembly sealingly closed in its inner part. The respective axes of said assembly are horizontal to a front face of said basic support structure and are encased with corresponding upper cylindrical and lower prismatic heads; said upper cylindrical heads including concave recesses, while said lower prismatic heads include semispherical heads. A cutting blade is mounted between said upper cylindrical heads. Within said upper cylindrical and lower prismatic heads, there is a front cover which is transparent and includes lateral openings, said transparent cover defining a juice extracting chamber.

Despite of the efficiency proven by the above machine, it is noted the existence of some points to be improved mainly with respect to the fruits feeding to the extracting mechanism of said machine.

Another aspect to be improved relates to the elimination of the extracting residues which generally remain accumulated at the machine screen, because it lacks means to enable the residues to be withdrawn.

One objective of the present invention resides on the fact of providing an improved juice extracting machine having an outline different from the known types.

Another objective of the present invention is to provide an improved juice extracting machine with means to enable elimination of the residues resulting from the juice extraction, as these residues usually remain accumulated at the screen.

It is a further objective of the present invention to provide a juice extracting machine showing a better accommodation for the fruits to be processed, thereby improving its functionality.

SUMMARY OF THE INVENTION

Having in mind the known construction and in view of the proposed objectives, the improved juice extracting machine of the present invention has been developed comprising an upper structure inside which a gear box is housed and connected to a motor reducer assembly which actuates one gear that transfers its rotation movement to a second gear which is placed upwardly in relation to the first gear. The second gear transfers the movement received from the first gear to a third gear that is substantially smaller, and which moves by means of a vertically placed pinion, a feeding cone arranged within the fruit reservoir which is situated over the referred to upper structure.

Said third gear is mechanically engaged with a fifth gear which transmits the received movement to a driving current of a worm arranged horizontally within the screen of the present improved juice extracting machine. Between the fifth gear and the driving gear of said worm, it is provided with a current tightener.

The rotary movement of the second and third gears is transmited to said cylindrical heads arranged side by side on the front face of the gear box, said cylindrical heads working in correspondence with a pair of lower prismatic heads, arranged side by side at a plane slightly below said cylindrical heads.

Closing the upper structure front face, the machine of the present invention includes a protector made of translucent or transparent material. Said protector includes said cylindrical heads, said lower prismatic heads, and also juice conduits including a channel-shaped screen along which a worm is positioned. The rotary movement of said worm causes the solid residues to be moved outwards said of screen area.

As previously described, the juice extracted from the processed fruits is directed to a screen that is continuously sweeped by the worm rotation. After being screened the juice is then guided to a transparent receptacle whose bottom walls are substantially inclined towards the center, where a cock is arranged to control the passage of juice either to a cup or to any other container positioned over a collecting tray. Said collecting tray includes a grid covering its whole area.

The upper structure which houses the drive unit is positioned along the gear box. A set of heads and all fruit processing elements are arranged over a lower structure having dimensions compatible with those of said upper structure and then forming with this upper structure, a compact assembly having inside a great receptacle used to store all kinds of residues resulting from the juice extracting process, e.g. peels, seeds and others. Peels are directed to said receptacle through conduits provided in the protector which covers the whole front face of said upper structure. Upper ends of said conduits are situated adjacent said lower prismatic heads, and the lower ends of said conduits are positioned at ducts turned towards said receptacle, said ducts being placed inwardly at the sides of the lower structure.

As regards seeds and other solid residues accumulated by the screen of the present extracting machine, they are continuously removed by the worm and guided to a residue collector which includes a vertical residue conductor positioned in its inner part next said residue collector. Said residue conductor is aligned with the receptacle arranged inside the lower structure.

Likewise, the juice eventually poured out over the collecting tray is directed to the receptacle placed inside the lower structure. Said lower structure includes a set of wheels to make movement easier.

The gear assembly which actuates the upper cylindrical and lower prismatic heads, as well as the worm are suitably arranged and grouped in a gear box having a cover, said gear box being situated within the upper structure.

BRIEF DESCRIPTION OF THE DRAWINGS

The improved juice extracting machine of the present invention will hereinafter be described with respect to the attached drawings in which:

FIG. 1 shows a front view of said juice extracting machine;

FIG. 2 shows a lateral view of said machine obtained along arrow A indicated in FIG. 1;

FIG. 3 shows a posterior view of said improved juice extracting machine;

DETAILED DESCRIPTION OF THE INVENTION

Figure 4:
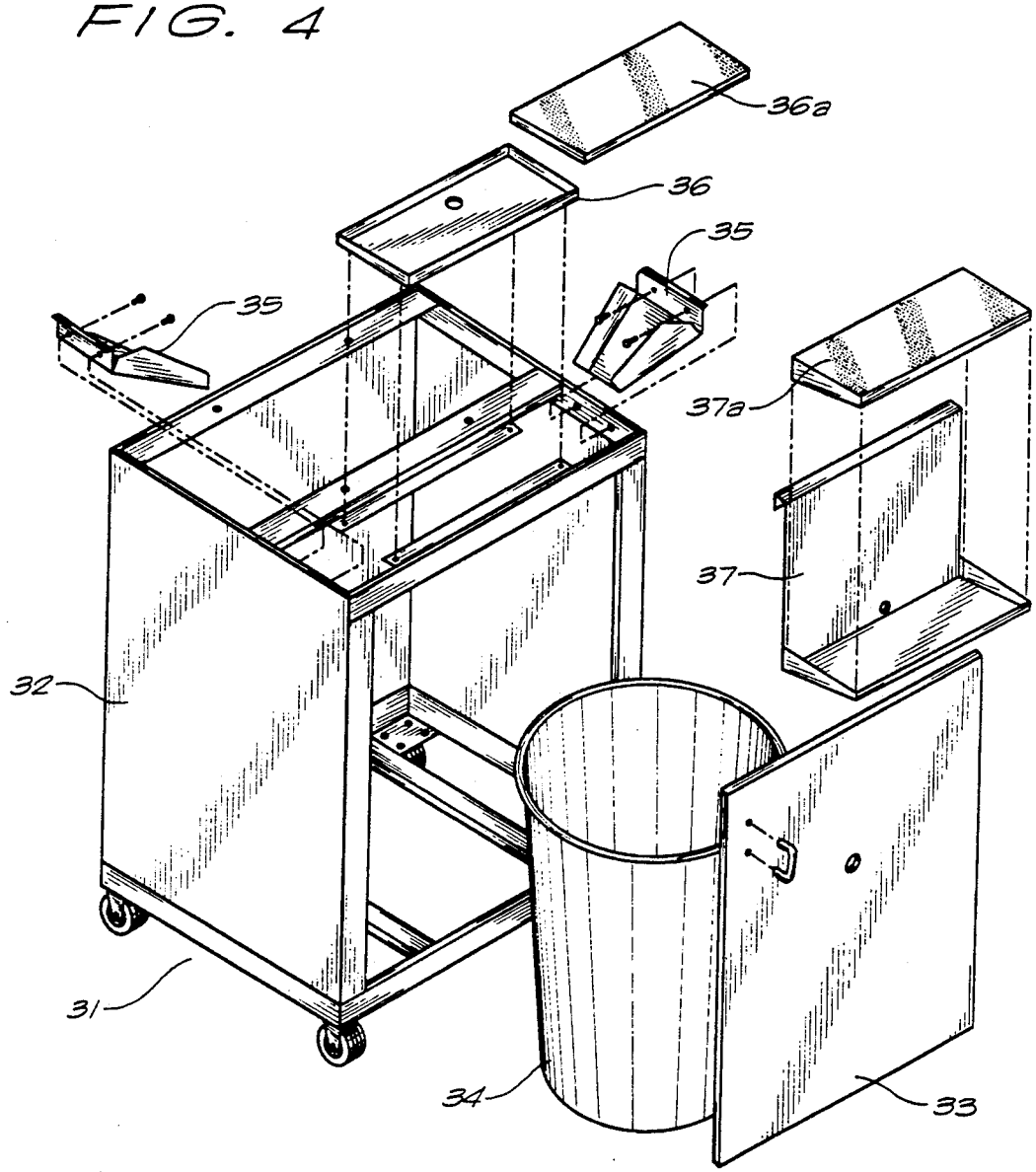
FIG. 4 shows an exploded perspective view of the lower structure of the present machine.
Figure 5:
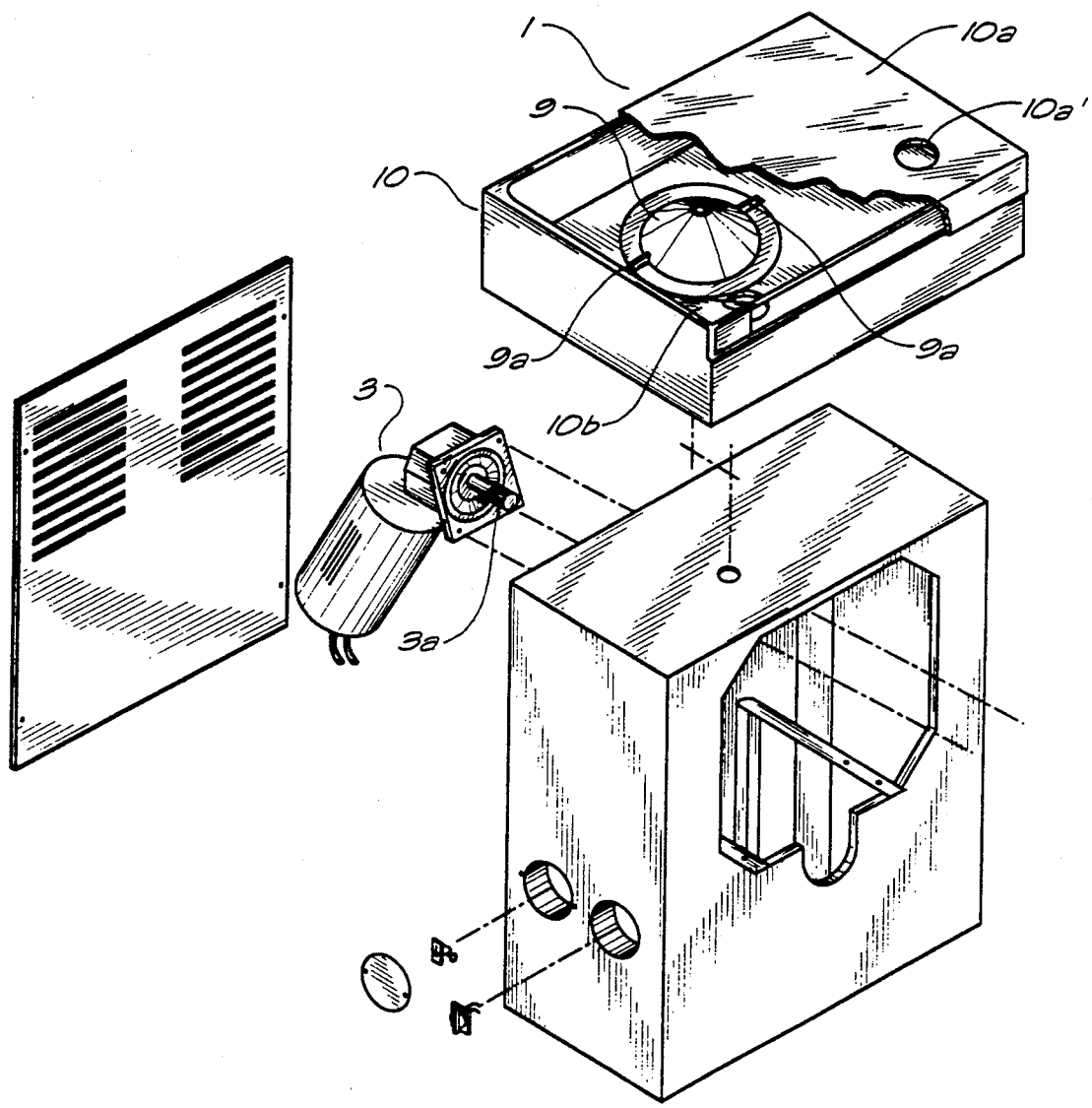
FIG. 5 shows a perspective view of the upper structure of said machine.

According to the illustration of the aforementioned figures, the improved juice extracting machine object of the present invention comprises an upper structure 1 housing a gear box 2 connected to a motor reducer assembly 3 having a toothed axis 3a engaged with a gear 4 which transfers its rotary movement to a second gear 5 placed upwardly, said second gear 5 transferring through an intermediary gear 4a the movement received from gear 4 to a third gear 6. Said third gear 6 is axially engaged with a fourth gear 7 which is substantially smaller and which moves by means of a vertically positioned pinion 8. A feeding cone 9 is placed within the fruit reservoir that is located over the upper structure 1.

The third gear 6 is mechanically connected to a fifth gear 11 which transmits the received movement to a chain 12 through a toothed wheel 13 axially connected to the fifth gear 11, said chain 12 being engaged with a second toothed wheel 13a mechanically connected to a worm 14 arranged horizontally inside a screen 15. A chain tightener 16 is provided between the toothed wheel 13 and the other toothed wheel 13a.

The rotary movement of the gears 5 and 6 is transferred to upper cylindrical heads 17 aligned side by side along the front face 18 of the gear box 2, said upper cylindrical heads 17 working in correspondence with a pair of lower prismatic heads 19, arranged side by side at a plane slightly below said upper cylindrical heads 17.

Figure 6:
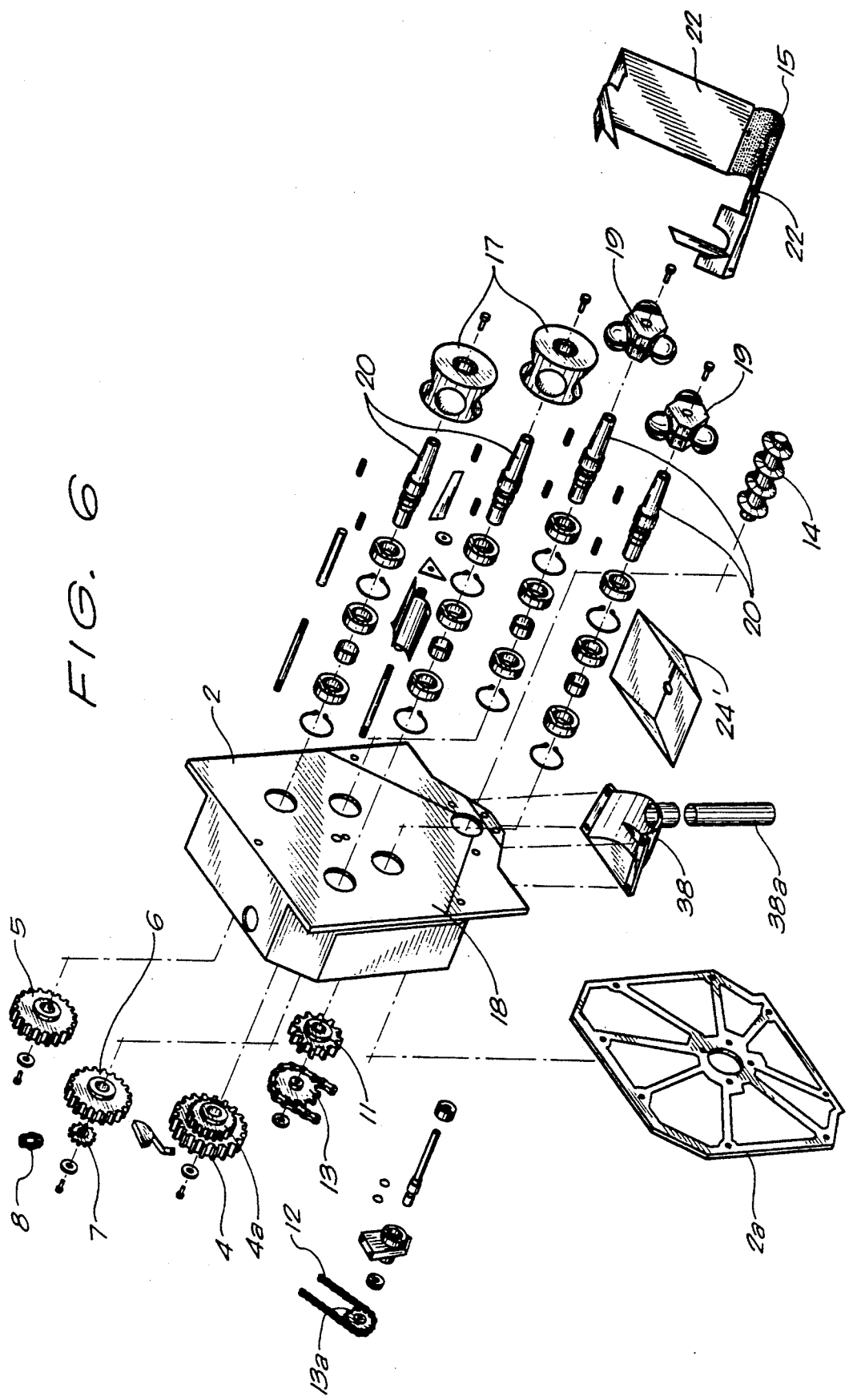
FIG. 6 shows an exploded perspective view of the gear box, as well as of the heads responsible for the fruit processing.

According to the illustration provided by FIG. 6, upper cylindrical head 17 and lower prismatic head 19 are mechanically connected to gears 5, 6, 4 and 11 by a set of axles 20 which transfix the front face 18 of the gear box 2.

Closing the front face of the upper structure 1, the machine of the present invention includes a protector 21 made of translucent or even transparent material, said protector 21 including said upper cylindrical heads 17, as well as said lower prismatic heads 19, and diverter planes 22 at whose lower ends a screen 15 is situated and over which the worm 14 is positioned.

Figure 7:
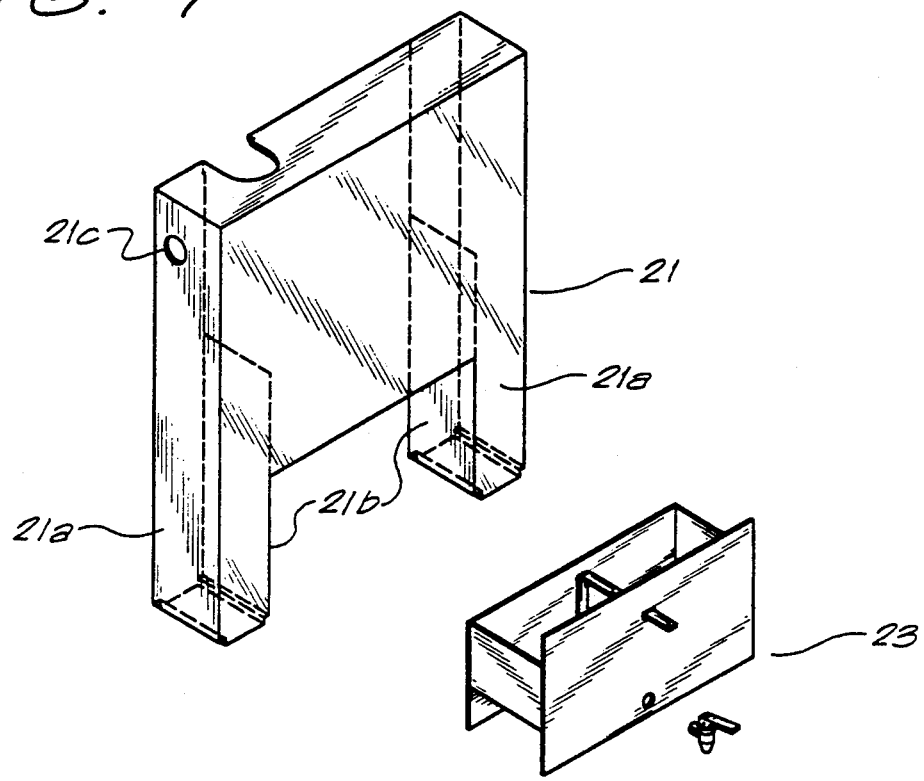
FIG. 7 shows a perspective view of the protector which covers the front face of the upper structure, said FIG. 7 further showing a perspective view of the receptacle in which the processed juice is stored.
Figure 8:
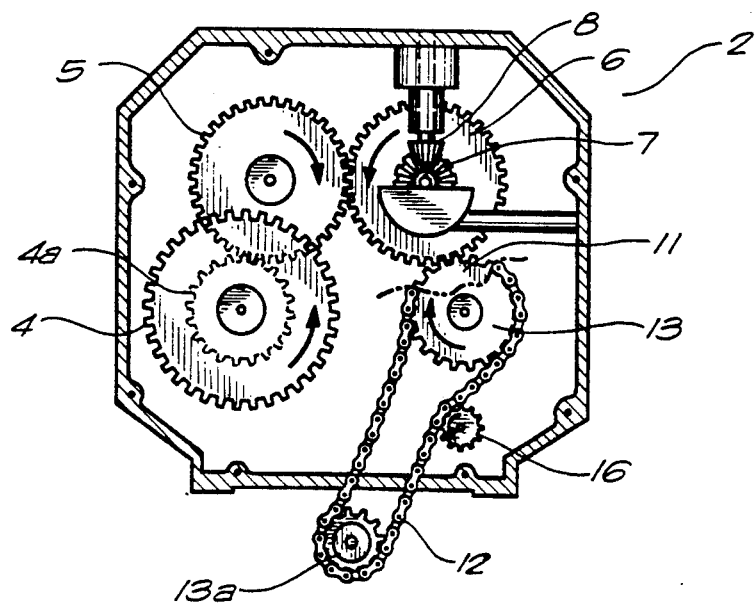
FIG. 8 shows a posterior schematic view of the gear box where the inner arrangement of its components can be seen, said figure further including arrows indicating rotary movement of said gears.
Figure 9:
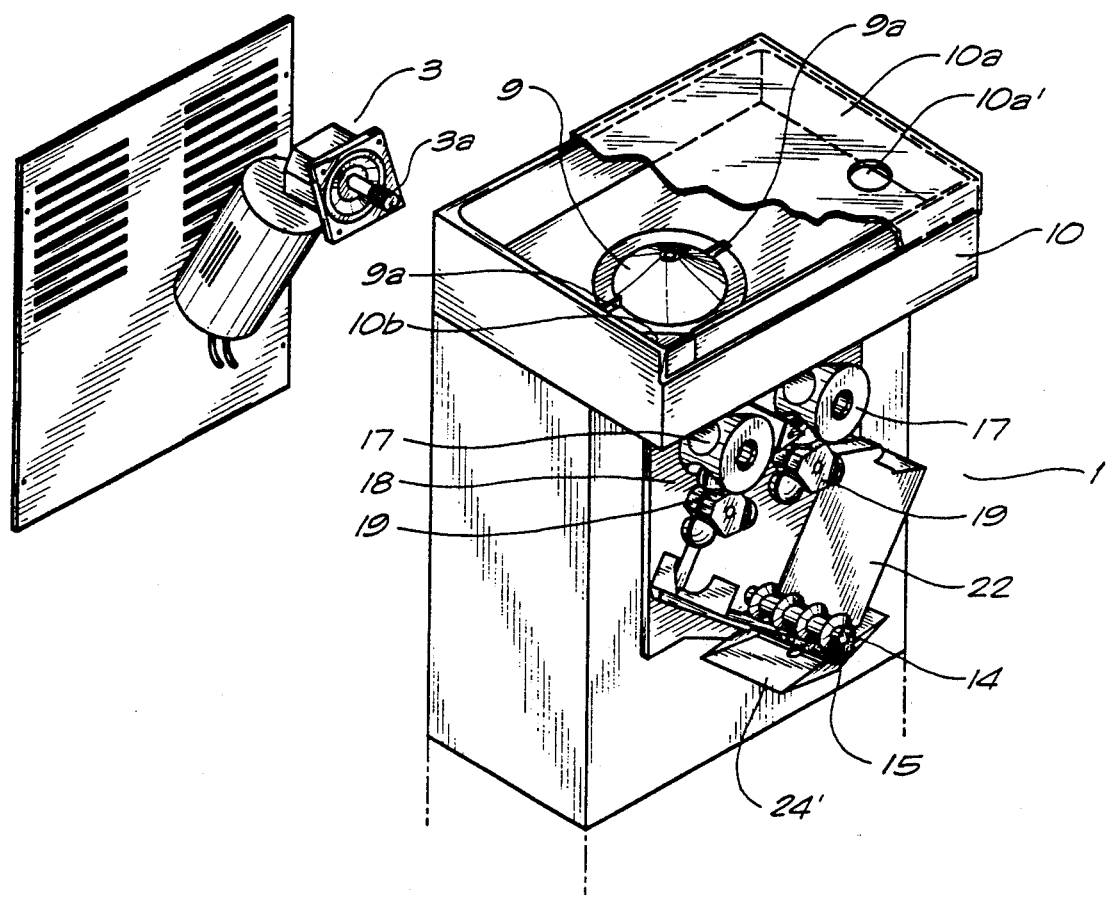
FIG. 9 shows a perspective view of the upper structure, where heads and other components are dismounted next the gear box.

The protector 21 which is better viewed in FIG. 7 incorporates conduits or channels 21a formed by inner walls 21b. Said protector 21 further provides its bottom portion with a cutout that allows introduction of a juice reservoir 23 situated under a duct 24' located under said screen 15.

The juice reservoir 23 includes a bottom 23a formed of inclined planes 23a', which allows positioning of a cock 23b at its deepest point. Said cock 23b is attached to a front wall 23c, and besides the inclination occuring at said bottom 23a, said juice reservoir 23 shows an inclination forwards, as a result of the length difference between said front wall 23c and rear wall 23d.

Said juice reservoir 23 further includes a manually driven agitator 24 at the outer part of said juice reservoir 23, said agitator 24 includes a blade 24a showing at its lower edge the same angle formed by the bottom 23a. Said blade 24a is fixedly connected to a vertical rod 24b which upon passing through a cutout 24c' provided at support 24c over a 90° fold, generates a horizontal extension 24a' whose end portion transfixes a rectangular cutout 23c' provided in the front wall 23c of said reservoir 23.

Figure 14:
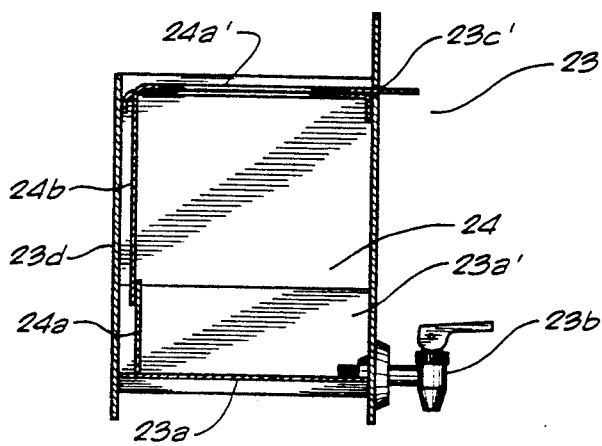
FIG. 14 shows a lateral view taken along arrow A—A of FIG. 13.
Figure 15:
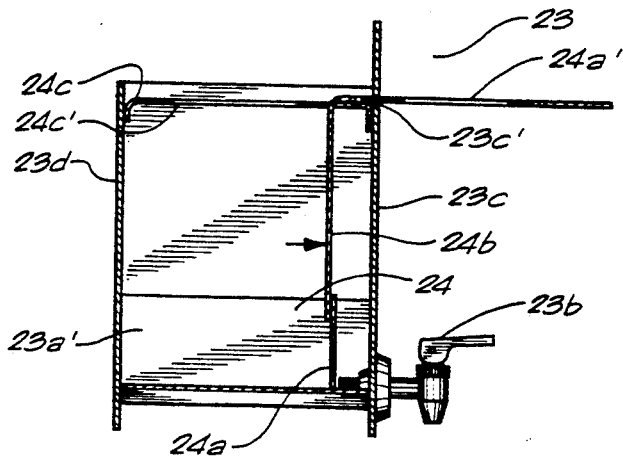
FIG. 15 shows a lateral view of the juice receptacle which forms part of the present juice extracting machine, the present figure serving to illustrate movement of the manual agitator which integrates the mentioned receptacle.

According to the illustrations provided by FIGS. 14 and 15, said agitator 24 may be manually moved from a back position, as shown in FIG. 14, up to an advanced position, as shown in FIG. 15.

Another aspect of the present machine relates to the lower prismatic heads 19, and more specifically to the provision of a contouring groove 19a. In heads of conventional construction such a feature was limited to the semispherical heads 19b, and thus under given circumstances the end of the extracting member 25 touched the ribs 19c of the central block 19d, thus causing damage and impairing the good performance of the machine.

Figure 11:
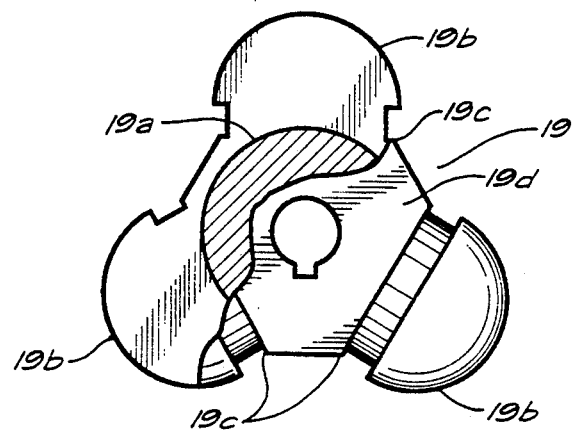
FIG. 11 shows a frontal view in partial section of the head illustrated by the previous figure.
Figure 12:
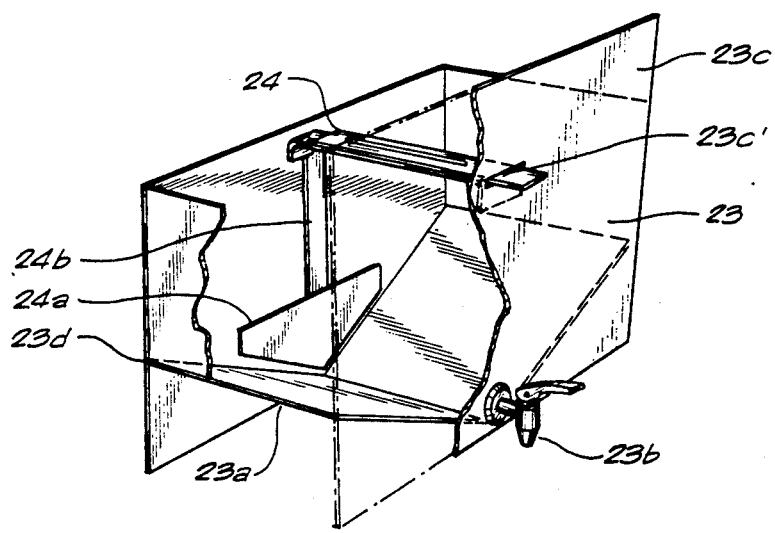
FIG. 12 shows a perspective view in partial section of the juice receptacle which integrates the present improved juice extracting machine.
Figure 13:
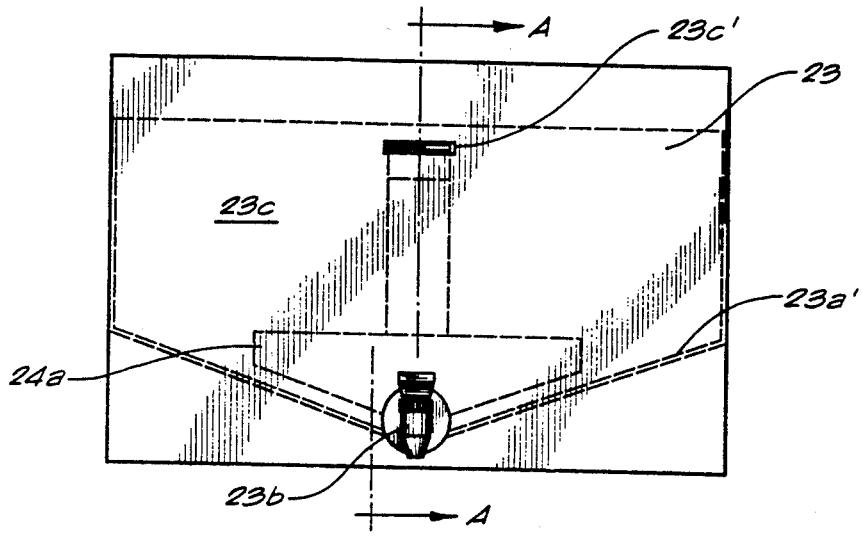
FIG. 13 shows a frontal view of the juice receptacle illustrated in the previous Figure.

As shown by FIG. 11 which is a partial sectional front view of the lower prismatic head 19, it can be seen that said contouring groove 19a is produced so as to form a circular surface around the central block 19d of said lower prismatic head 19.

Figure 10:
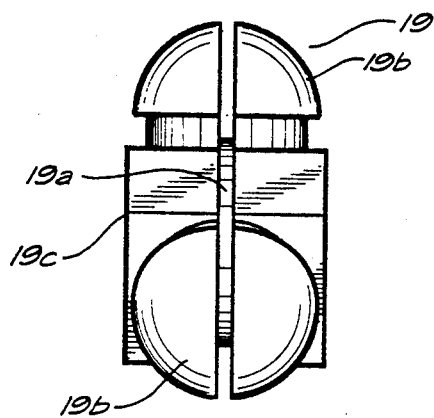
FIG. 10 shows a lateral view of a lower prismatic head.

FIG. 10 in its turn shows a lateral view of the improved head which forms part of the present machine. The view provided by said figure serves to prove that said contouring groove 19a is not limited to said semispherical heads 19d, and said groove is formed so as to be positioned in a level below the ribs 19c along the periphery of said central block 19d.

Therefore, at any moment during operation of the present machine, and more specifically at the exact moment where half of a fruit already processed is to be pulled out from the semispherical heads 19b of each of the lower prismatic heads 19, any resistance of the peel which eventually causes the extracting element 25 to be bent shall not cause damage because the contouring groove 19a shows itself as a continuous surface free of obstacles.

Figure 16:
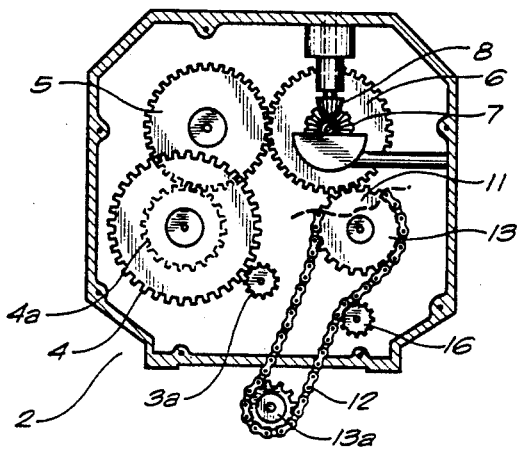
FIG. 16 shows a schematic view of the gear box of said juice extracting machine and the coupling point of the gears arranged inside it, and the toothed axis which moves the gears according to a first driving modality.
Figure 16A:
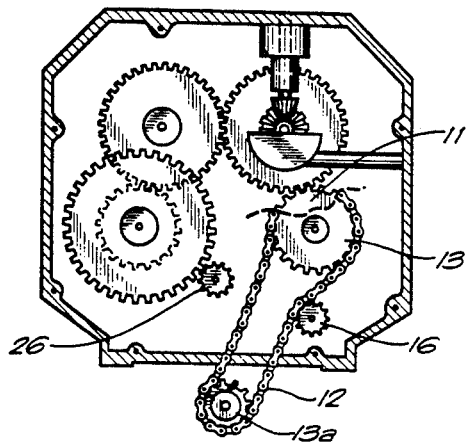
FIG. 16a shows a schematic view of the gear box of the juice extracting machine and the coupling point of the gears arranged inside it, and the toothed axis that moves the gears according to another driving modality.
Figure 17:
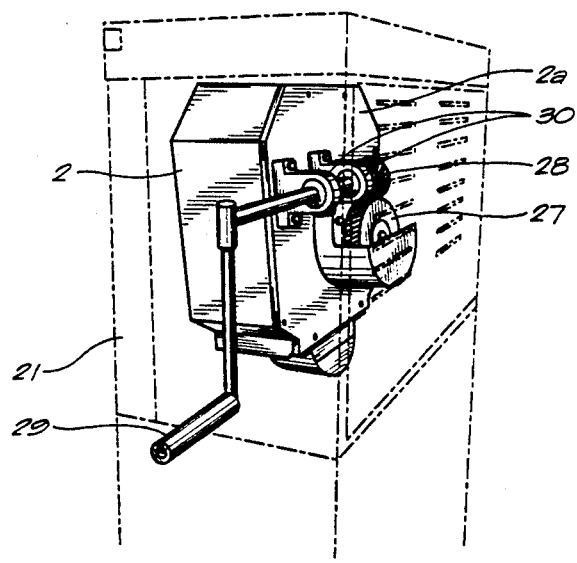
FIG. 17 shows a perspective posterior view of the upper structure, indicated schematically, where it can be seen the gear box driven according to a manual modality of operation.
Figure 18:
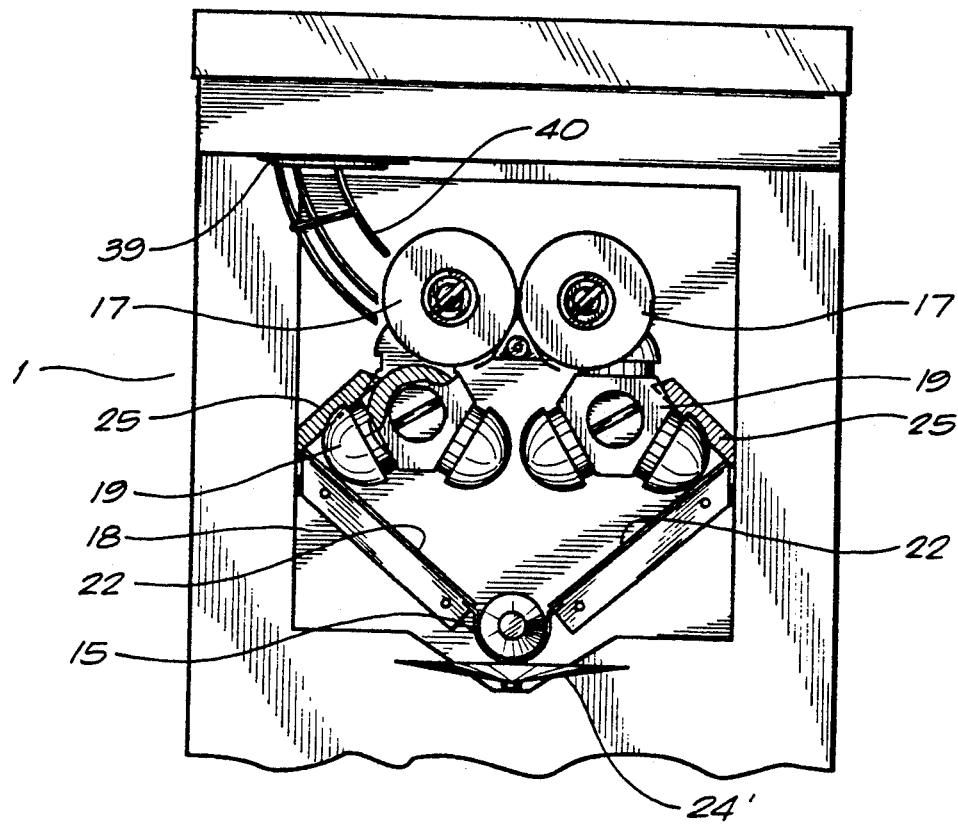
FIG. 18 shows a frontal view of the upper portion of the present machine without its protector, said view serving to illustrate the positioning of the diverse components forming part of the present machine.
Figure 19:
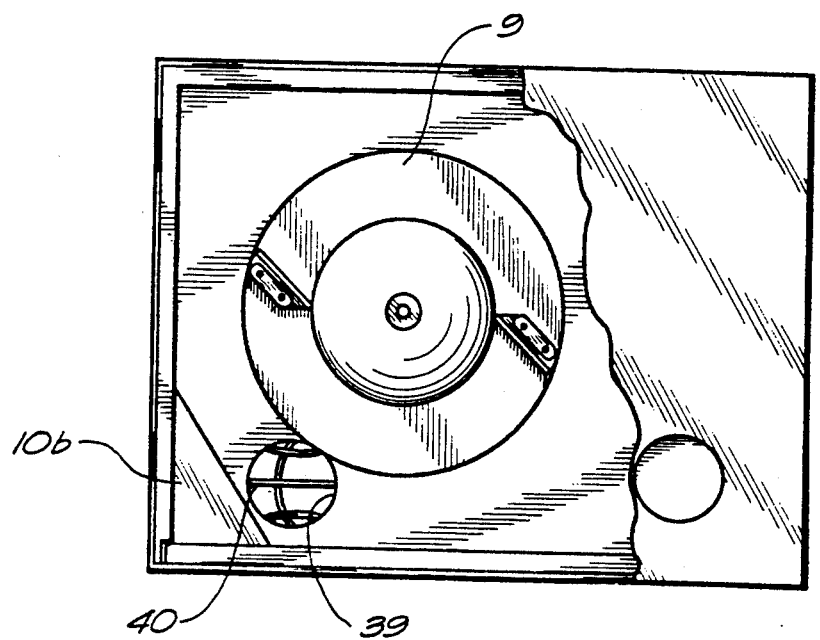
FIG. 19 shows a superior view of said machine where it can be seen its feeding cone whose rotary movement causes the fruits to be in continuous movement.

In the second driving modality represented in FIGS. 16a and 17, said gear box 2 is connected by a toothed axis 26 schematically illustrated in FIG. 16a which is directly connected to a crown 27 which receives a pinion 28, and the rotary movement of a crank 29. Said crank 29 is supported by bearings 30 fixed to the rear face 2a of the gear box 2. This feature allows the present machine to be used in public places which lack power sources.

In this way, the operator performs the function of the motor reducer assembly 3 by moving gears 4, 5, 6 and 11 which drive the operating cycle of the lower prismatic 19 and upper cylindrical 17 heads.

Supporting the whole load of the upper structure 1 and its different components, the machine of the present invention includes a lower structure 31 formed by a cabinet 32 having a front gate 33 which provides access to an inner compartment receiving a great container 34 inside which solid and liquid residues are deposited as a result of the juice extracting process.

In each of the inner sides of said cabinet 32, direction ducts 35 are fixed directly aligned with said channels 21a of protector 21. Therefore, each of the processed fruit halves is pulled out from the semispherical heads 19b by said extracting elements 25, thus falling into channels 21a up to reaching direction ducts 35 which force the processed fruit peels into said container 34.

Cabinet 32 further includes a tray 36 fixed at its front upper part. Said tray 36 has a grid 36a, and a juice reservoir 23 is positioned over said tray.

Said tray 36 allows any juice residue which drips to the juice reservoir 23 to be collected and directed to a container 34 housed inside cabinet 32. The same occurs with the juice which is eventually poured out over the tray 37 defined so as to be engaged at the front face of said cabinet 32. Similarly to what occurs with its related tray 36, tray 37 also includes a grid 37a. Likewise, said tray 37 directs the juice poured out over it to a container 34.

As it can be easily noted, operation of the improved juice extracting machine object of the present invention is carried out in a simple way, wherein every and any solid or liquid residue is automatically guided to an appropriate container for storage.

In this particular arrangement, the machine of the present invention shows desirable hygenic characteristics, both with respect to the juice processing, and also with respect to its storage in the juice reservoir 23 and also storage of what could be considered as garbage resulting from the extracting process.

Said container 34 further receives residues resulting from the cleaning operation of the screen 15 by worm 14. Said worm 14 includes a collector 38 attached to the lower face of the gear box 2, said collector 38 showing a shape which causes the residues to be directed to a pipe 38a aligned with said container 34.

Another aspect which makes the improvements introduced into the present machine different from the characteristics relating to the construction proposed by PI 9005883 to the juice extracting machine refers to its production efficiency expressed in liters of juice processed per minute. Machines including the construction proposed by said PI 9005883 reach a production rate of 1.2 liters/minute.

The improvements made to the toothed axle 3a of the motor reducer add two more teeth. The toothed axle, which previously had twelve teeth, now has fourteen teeth. Therefore, there is a substantial increase of the production efficiency of the present machine which is capable of processing 2.0 liters of juice per minute. Such an improvement further results from the feeding procedure to the upper cylindrical 17 and lower prismatic 19 heads.

The provision of feeding cone 9 allows continuous delivery of the fruits stored in the fruit reservoir 10, as rotation of said feeding cone 9 moves the fruits, thus causing them to be directed to a channel 39 having a guide member 40 aligned with one of the upper cylindrical heads 17.

As said feeding cone 9 is mechanically connected to the gear box 2, its operation is automatic, in both modalities of use. The first driving modality makes use of the motor reducer assembly 3. The second modality makes use of the crank 29.

By including the upper cover 10a covering the fruit receptacle 10 the present machine is complete, being further able to perform selection of the fruits to be processed, as said cover includes a circular window 10a with a diameter which prevents fruits having a diameter larger than the desirable one from entering into said receptacle.

Another characteristic of the present machine comprises the supply of survey windows 21c at the lateral walls of the protector 21. Said windows enable the operator to act directly at the upper cylindrical heads 17, as well as lower prismatic heads 19 in case any fruit is retained.

Moreover, with respect to the feeding cone 9, it should be pointed out that inclusion of flaps 9a arranged at its surface enable movement of the fruits contained in the fruit receptacle 10 without causing them to be damaged. Said fruit receptacle 10 further including a triangular projection 10b positioned along the channel 39 which includes a guide member 40.

The foregoing disclosure and description of the invention is illustrative and explanatory thereof. Various changes in the details of the illustrated configuration may be made within the scope of the claims without departing from the true spirit of the invention. The present invention should only be limited by the following claims and their legal equivalents.

I claim:

1. An improved juice extracting machine of the type used to extract juice for citric fruits comprising:

an upper structure housing a gear box connected to a motor reducer assembly, said motor reducer assembly having a toothed axle engaged with a first gear, said first gear transferring a rotary movement to a second gear positioned thereabove, said second gear transferring said rotary movement by an intermediary gear to a third gear, said third gear being axially engaged with a fourth gear, said fourth gear being smaller than said third gear, said fourth gear drivingly connected to a vertically positioned pinion;

a feeding cone positioned inside a fruit receptacle located over said upper structure, said third gear being mechanically engaged with a fifth gear, said fifth gear transmitting movement to a chain by a first toothed wheel axially engaged with said fifth gear, said chain being engaged to a second toothed wheel, said second toothed wheel mechanically connected to a worm horizontally positioned within a screen, a tightener of said chain positioned between said first toothed wheel and said second toothed wheel;

said second and third gears drivingly connected to upper cylindrical heads aligned side by side at a front face of said gear box, said upper cylindrical heads movable in correspondence with a pair of prismatic heads arranged side by side at a plane below said upper cylindrical heads, said upper cylindrical heads and said lower prismatic heads being mechanically connected to said first, second, third and fifth gears by a set of axles which transfix the front face of the gear box;

a protector closing a front face of the upper structure, said protector receiving said upper cylindrical heads and said lower prismatic heads and a diverter plane, a screen being positioned at a lower end of said diverter plane, said worm being positioned over said screen, said protector having a conduit formed by an inner wall, said protector having a cutout area for receiving a juice reservoir below said screen, said juice reservoir having an inclined plane therein, said reservoir having a cock attached to a front wall, said reservoir having a rear wall positioned opposite said front wall, said reservoir receiving a manually driven agitator therein, said agitator having a blade fixedly connected to a vertical rod, said rod being folded on a side of a cutout formed on a support in said reservoir, said rod having an end portion transfixing a rectangular cutout formed on said front wall of said reservoir;

a lower structure connected to said upper structure, said lower structure having an inner compartment for receiving a container therein, said lower structure having a front gate covering said inner compartment, a pair of direction ducts received with sides of said lower structure, said direction ducts directly aligned with said conduits of said protector;

a tray affixed to said container and said lower structure, said tray having a grid over which said juice reservoir is positioned; and a collector positioned at said worm, said collector being fixed to a lower face of said gear box, said collector having a pipe aligned with said container.

2. The improved juice extracting machine according to claim 1, each of the lower prismatic heads having a contouring groove along which an extracting member is positioned.

3. The improved juice extracting machine according to claim 2, said contouring groove having a circular surface around a central block of the lower prismatic heads.

4. The improved juice extracting machine according to claim 1, said upper cylindrical heads and said lower prismatic heads drivingly connected to a toothed axle directly connected to a crown, said crown drivingly connected to a crank by a pinon, said crank being supported by bearings fixed to a rear face of the gear box, said toothed axle being mechanically engaged to the gear of said gear box.

5. Improved juice extracting machine according to claim 1, said fruit receptacle (10) having a channel (39) connected to the feeding cone (9), said channel (39) being provided with a guide member (40) which is aligned with one of the upper cylindrical heads (17).

6. The improved juice extracting machine according to claim 1, said toothed axle of the motor reducer assembly has fourteen teeth.

7. The improved juice extracting machine according to claim 1, a lower edge of the blade of the agitator has a same angle as defined by the bottom of the juice reservoir.

8. The improved juice extracting machine according to claim 1, said bottom of the juice reservoir is formed by inclined planes.

9. The improved juice extracting machine according to claim 8, said inclined planes form part of the bottom of the juice reservoir so as to conform with an angular range of 20° to 45°.

10. The improved juice extracting machine according to claim 1, said cabinet includes a set of wheels.

11. The improved juice extracting machine according to claim 1, said fruit receptacle includes an upper cover having a circular window affixed thereto.

12. The improved juice extracting machine according to claim 1, said protector having survey windows affixed thereto.

13. The improved juice extracting machine according to claim 1, said feeding cone having flaps affixed thereto.

* * * * *